United States Patent
Yan et al.

(10) Patent No.: US 11,285,676 B2
(45) Date of Patent: Mar. 29, 2022

(54) CONTROL METHOD OF ULTRASONIC WELDING SYSTEM, ULTRASONIC WELDING SYSTEM AND STORAGE MEDIUM

(71) Applicants: CONPROFE TECHNOLOGY GROUP CO., LTD., Guangdong (CN); SMARTGUY INTELLIGENT EQUIPMENT CO., LTD., Guangdong (CN); SMARTGUY INTELLIGENT EQUIPMENT CO., LTD. GUANGZHOU BRANCH, Guangdong (CN)

(72) Inventors: Bingjiang Yan, Guangdong (CN); Chengyong Wang, Guangdong (CN); Weiqiu Li, Guangdong (CN); Jifeng He, Guangdong (CN); Jianjian He, Guangdong (CN); Jinbo Lu, Guangdong (CN)

(73) Assignees: CONPROFE TECHNOLOGY GROUP CO., LTD., Guangdong (CN); SMARTGUY INTELLIGENT EQUIPMENT CO., LTD., Guangdong (CN); SMARTGUY INTELLIGENT EQUIPMENT CO., LTD. GUANGZHOU BRANCH, Guangdong (CN)

( * ) Notice: Subject to any disclaimer, the term of this patent is extended or adjusted under 35 U.S.C. 154(b) by 0 days.

(21) Appl. No.: 17/502,020

(22) Filed: Oct. 14, 2021

(65) Prior Publication Data
US 2022/0032556 A1    Feb. 3, 2022

Related U.S. Application Data

(63) Continuation of application No. PCT/CN2021/074591, filed on Feb. 1, 2021.

(30) Foreign Application Priority Data

May 8, 2020 (CN) .......................... 202010383640.0

(51) Int. Cl.
  B32B 37/00    (2006.01)
  B29C 65/00    (2006.01)
  B29C 65/08    (2006.01)
(52) U.S. Cl.
  CPC .......... B29C 66/9512 (2013.01); B29C 65/08 (2013.01); B29C 66/9511 (2013.01); B29C 66/9513 (2013.01)
(58) Field of Classification Search
  USPC ........................................... 156/64
  See application file for complete search history.

(56) References Cited

U.S. PATENT DOCUMENTS

| 6,047,602 | A  |   | 4/2000  | Lynnworth |                    |
|-----------|----|---|---------|-----------|--------------------|
| 8,721,817 | B2 | * | 5/2014  | Klinstein | B29C 66/9221 156/64 |
| 8,858,742 | B2 | * | 10/2014 | Spicer    | B29C 65/08 156/64  |

FOREIGN PATENT DOCUMENTS

| CN | 108471242 | 8/2018  |
|----|-----------|---------|
| CN | 108654967 | 10/2018 |

(Continued)

OTHER PUBLICATIONS

"International Search Report (Form PCT/ISA/210) of PCT/CN2021/074591", dated Apr. 27, 2021, pp. 1-5.

(Continued)

Primary Examiner — James D Sells
(74) Attorney, Agent, or Firm — JCIP Global Inc.

(57) ABSTRACT

A control method of an ultrasonic welding system comprises: detecting operation of the ultrasonic welding system immediately while the ultrasonic welding system is in a (Continued)

working state; acquiring a current working frequency of an ultrasonic generator in the ultrasonic welding system while the ultrasonic welding system is detected to complete a preset first operation every time; determining a current frequency searching range of the ultrasonic generator according to the current working frequency of the ultrasonic generator; controlling the ultrasonic generator to search for an anti-resonance point in the current frequency searching range; and adjusting the working frequency of the ultrasonic generator to be an anti-resonance point while the anti-resonance point is searched in the current frequency searching range.

10 Claims, 3 Drawing Sheets

(56) References Cited

FOREIGN PATENT DOCUMENTS

| CN | 109774164 | 5/2019 |
| CN | 111605204 | 9/2020 |

OTHER PUBLICATIONS

"Written Opinion of the International Searching Authourity (Form/ISA/237) of PCT/CN2021/074591", dated Apr. 27, 2021, pp. 1-5.
"Office Action of China Counterpart Application", with English translation thereof, dated Oct. 14, 2020, p. 1-p. 16.

* cited by examiner

CONTROL METHOD OF ULTRASONIC WELDING SYSTEM, ULTRASONIC WELDING SYSTEM AND STORAGE MEDIUM

CROSS-REFERENCE TO RELATED APPLICATION

This application is a continuation of international application of PCT application serial no. PCT/CN2021/074591 filed on Feb. 1, 2021, which claims the priority benefit of China application no. 202010383640.0 filed on May 8, 2020. The entirety of each of the above mentioned patent applications is hereby incorporated by reference herein and made a part of this specification.

BACKGROUND

Technical Field

The invention relates to the field of ultrasonic welding technology, and in particular, to a control method of an ultrasonic welding system, an ultrasonic welding system and a storage medium.

Description of Related Art

The ultrasonic welding system is suitable for welding procedures of welding full-plastic nose bridge strips of masks and medical protective clothing, welding after folding edges, welding breather valves, multi-layer roll welding, welding ear bands and the like, and is also suitable for welding procedures of paper diapers, packaging bags or metal materials.

At present, an ultrasonic welding system is a core component for mask production, and the performance of the ultrasonic welding system has a great influence on the production speed and quality of the mask. The existing ultrasonic welding system comprises an ultrasonic generator, an ultrasonic transducer, an ultrasonic amplitude transformer and a welding head, wherein the ultrasonic generator generates high-voltage and high-frequency signals, and the signals are converted into high-frequency mechanical vibration through the ultrasonic transducer so as to be applied to a workpiece. In the process of implementing the invention, the inventor finds that the prior art has at least the following technical problems: in the welding process of the mask ear band, the ultrasonic generator works in a fixed frequency mode; the natural frequency of the transducer can drift along with the changes of factors such as welding load, transducer temperature, environment temperature and the like; at this time, if the power frequency of the ultrasonic generator does not change, the ultrasonic welding system cannot work at the resonance point, so that the phenomenon of false welding or desoldering is easy to occur, the welding effect is unstable, and the quality of the welded workpiece is affected.

SUMMARY

The invention aims to provide a control method of an ultrasonic welding system, an ultrasonic welding system and a storage medium, which can improve the welding stability of the ultrasonic welding system so as to ensure the quality of a workpiece to be welded (such as a mask, medical protective clothing and the like).

In order to solve the above technical problem, the present invention provides a control method of an ultrasonic welding system, specifically comprising:

while the ultrasonic welding system is in a working state, detecting operation of the ultrasonic welding system immediately;

while the ultrasonic welding system is detected to complete each a preset first operation, acquiring a current working frequency of an ultrasonic generator in the ultrasonic welding system;

according to the current working frequency of the ultrasonic generator, determining a current frequency searching range of the ultrasonic generator;

controlling the ultrasonic generator to search for an anti-resonance point in the current frequency searching range;

while the anti-resonance point is searched in the current frequency searching range, adjusting the working frequency of the ultrasonic generator to be an anti-resonance point.

As a preferable scheme, the control method of an ultrasonic welding system, further comprising:

while the anti-resonance point is not searched in the current frequency searching range, counting a number of the times of the anti-resonance point not searched in the current frequency searching range;

while the number of the times of the anti-resonance point not searched in the current frequency searching range reaches a preset times threshold value, updating the current working frequency of the ultrasonic generator;

according to the updated current working frequency of the ultrasonic generator, re-determining the current frequency searching range of the ultrasonic generator;

after the ultrasonic welding system is detected to complete a preset second operation, controlling the ultrasonic generator to search the anti-resonance point within the re-determined current frequency searching range.

As a preferable scheme, the control method of an ultrasonic welding system, further comprising:

while the number of the times that the anti-resonance point not searched in the current frequency searching range does not reach the preset times threshold value, controlling the ultrasonic generator to search the anti-resonance point in the current frequency searching range again after detecting that the ultrasonic welding system completes the preset second operation.

As a preferable scheme, while the number of the times of the anti-resonance point not searched in the current frequency searching range reaches the preset times threshold value, updating the current working frequency of the ultrasonic generator, specifically comprising:

while the times of an anti-resonance point which is not searched in the current frequency searching range reaches the preset times threshold value, updating the current working frequency of the ultrasonic generator by the following formula:

$$f_{new} = f_{old} - f_1$$

Wherein $f_{new}$ is the current working frequency of the ultrasonic generator after updating; $f_{old}$ is the current working frequency of the ultrasonic generator before updating; $f_1$ is a preset first frequency threshold value.

As a preferred scheme, determining the current frequency searching range of the ultrasonic generator according to the current working frequency of the ultrasonic generator, specifically comprising:

according to the current working frequency of the ultrasonic generator, determining the upper limit value of the current frequency searching range of the ultrasonic generator by the following formula:

$$f_{upper}=f+f_2$$

Wherein $f_{upper}$ is the upper limit value of the current frequency searching range of the ultrasonic generator; f is the current working frequency of the ultrasonic generator; $f_2$ is a preset second frequency threshold value;

According to the current working frequency of the ultrasonic generator, determining the lower limit value of the current frequency searching range of the ultrasonic generator by the following formula:

$$f_{lower}=f-f_3$$

Wherein $f_{lower}$ is the lower limit value of the current frequency searching range of the ultrasonic generator; f is the current working frequency of the ultrasonic generator; $f_3$ is a preset third frequency threshold value.

As a preferred scheme, controlling the ultrasonic generator to search for anti-resonance point in the current frequency searching range, specifically comprising:

controlling the ultrasonic generator to search the frequency in the current frequency searching range, and acquiring a working current corresponding to each frequency point in the current frequency searching range;

judging whether a value of the working current corresponding to each frequency point is equal to a preset minimum value or not;

while the value of the working current corresponding to any frequency point is equal to the preset minimum value, determining the frequency point to be the anti-resonance point;

while the value of the working current corresponding to each frequency point is not equal to the preset minimum value, determining that the anti-resonance point is not searched in the current frequency searching range.

As a preferred scheme, wherein said the first operation, specifically comprising:

completing a welding operation of a preset number threshold value of workpieces and delaying a preset time threshold value.

As a preferred scheme, wherein said the second operation, specifically comprising:

completing the welding operation of the current workpiece.

As a preferred scheme, the control method of an ultrasonic welding system, further comprising:

controlling the ultrasonic generator to search for the anti-resonance point in a preset frequency searching range after the ultrasonic welding system is powered on;

taking the searched anti-resonance point as the working frequency of the ultrasonic welding system, and controlling the ultrasonic welding system to start working.

In order to solve the same technical problem, accordingly, an embodiment of the present invention further provides an ultrasonic welding system, which comprises a processor, a memory, and a computer program stored in the memory and configured to be executed by the processor, the processor implementing wherein the control method of an the ultrasonic welding system described above realized while the processor executing executes the computer program.

In order to solve the same technical problem, an embodiment of the present invention further provides a computer-readable storage medium, wherein a program is stored on the computer-readable storage medium, while the program runs, the control method of the ultrasonic welding system described above realized while the program executed.

Compared with the prior art, the invention provides a control method of an ultrasonic welding system, an ultrasonic welding system and a storage medium, wherein after the ultrasonic welding system enters a working state, while the ultrasonic welding system is detected to complete a preset first operation every time, controlling the ultrasonic generator to search for an anti-resonance point in the current frequency searching range, and while the anti-resonance point is searched in the current frequency searching range, adjusting the working frequency of the ultrasonic generator to be the anti-resonance point, so that the output frequency of the ultrasonic generator is kept consistent with the resonance frequency of the ultrasonic welding system, namely the ultrasonic welding system is ensured to work in a resonance state, the welding stability of the ultrasonic welding system is improved, and the phenomenon of false welding or desoldering in the welding process of the ultrasonic welding system is effectively prevented, thus ensuring the quality of the welded workpiece.

DESCRIPTION OF THE EMBODIMENTS

In the face of new crown epidemic situation, the invention is improved as follows in order to improve the production quality of the mask and the medical protective equipment.

Figure 1:
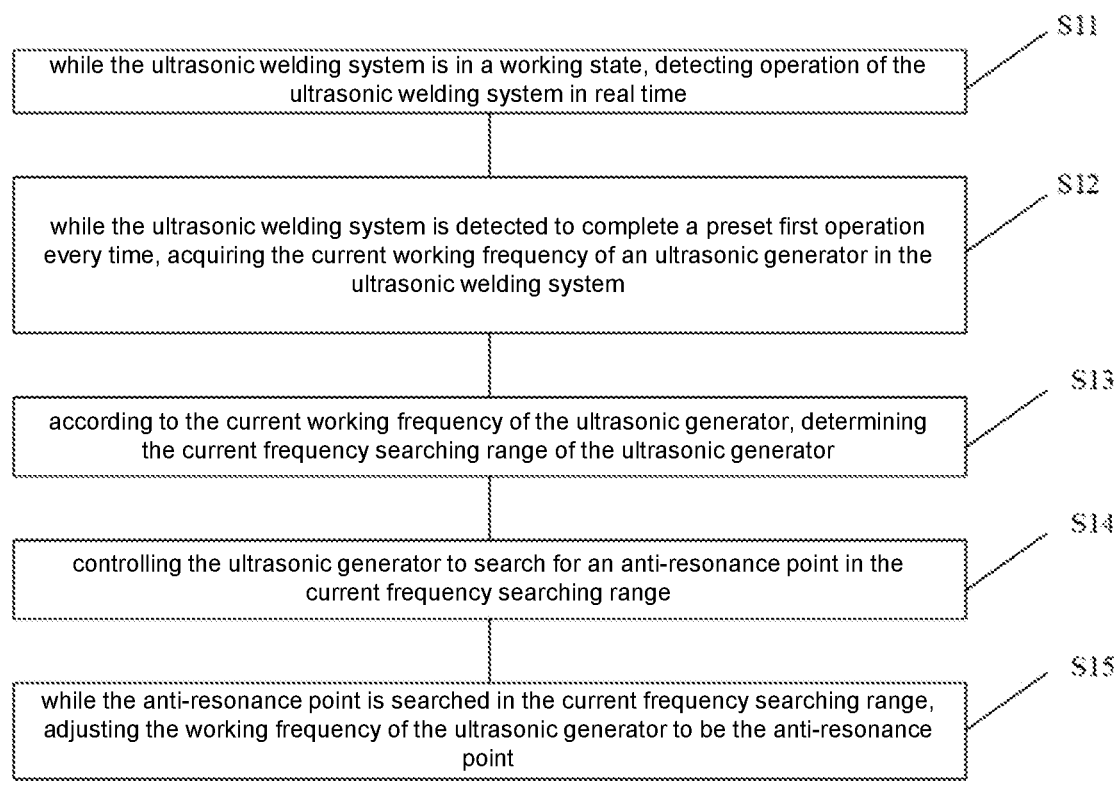
FIG. 1 is a schematic flow chart diagram of a control method of an ultrasonic welding system in accordance with an embodiment of the present invention.

Referring to FIG. 1, a schematic flow chart diagram of the control method of an ultrasonic welding system in accordance with an embodiment of the present invention is shown.

In an embodiment of the present invention, the control method of an ultrasonic welding system includes the following steps S11-S15:

S11, while the ultrasonic welding system is in a working state, detecting operation of the ultrasonic welding system in real time;

S12, while the ultrasonic welding system is detected to complete a preset first operation every time, acquiring the current working frequency of an ultrasonic generator in the ultrasonic welding system;

S13, according to the current working frequency of the ultrasonic generator, determining the current frequency searching range of the ultrasonic generator;

S14, controlling the ultrasonic generator to search for an anti-resonance point in the current frequency searching range;

S15, while the anti-resonance point is searched in the current frequency searching range, adjusting the working frequency of the ultrasonic generator to be the anti-resonance point.

It should be noted that, in the initial stage of the startup work of the ultrasonic welding system, the quality of the welded workpiece is reliable, the welding effect is stable, but the natural frequency of the transducer drifts with the changes of factors such as welding load, transducer temperature and environment temperature. Therefore, in this embodiment, after the ultrasonic welding system enters the working state, while it is detected that the ultrasonic welding system completes a preset first operation every time, frequency searching is performed to adjust the working frequency of the ultrasonic generator, so as to implement frequency tracking.

In the embodiment of the present invention, after the ultrasonic welding system enters a working state, while the ultrasonic welding system is detected to complete a preset first operation every time, controlling the ultrasonic generator to search for an anti-resonance point in the determined current frequency searching range, and while the anti-resonance point is searched in the current frequency searching range, adjusting the working frequency of the ultrasonic generator to be the anti-resonance point, so that the output frequency of the ultrasonic generator is kept consistent with the resonance frequency of the ultrasonic welding system, namely the ultrasonic welding system is ensured to work in a resonance state, the welding stability of the ultrasonic welding system is improved, and the phenomenon of false welding or desoldering in the welding process of the ultrasonic welding system is effectively prevented, thus ensuring the quality of the welded workpiece (such as mask, medical protective clothing and the like).

In a preferred embodiment, in step S12 of this embodiment, the first operation is specifically:

completing a welding operation of a preset number threshold value of workpieces and delaying a preset time threshold value.

Specifically, while step S12 is executed, the current operating frequency of the ultrasonic generator in the ultrasonic welding system is obtained while it is detected that the ultrasonic welding system has completed the welding operation of a preset number threshold value of workpieces and delayed the preset time threshold value. It can be understood that, at the initial stage of the startup work of the ultrasonic welding system, the welding effect is stable, so that while the ultrasonic welding system is detected to complete the welding operation of a preset number threshold value of workpieces and delay the preset time threshold value, the current working frequency of the ultrasonic generator in the ultrasonic welding system is obtained to determine the current frequency searching range of the ultrasonic generator and search the frequency, so as to adjust the working frequency of the ultrasonic generator, further realize frequency tracking, and avoid frequently adjusting the working frequency of the ultrasonic generator while ensuring that the ultrasonic welding system works in a resonance state.

In addition, it should be noted that both the preset number threshold value and the time threshold value may be set according to an actual use situation, and the present invention is not limited to this. Preferably, the preset number threshold value of the embodiment is 26-32; the time threshold value is 28 ms-32 ms.

In a preferred embodiment, in step S13 of this embodiment, determining the current frequency searching range of the ultrasonic generator according to the current operating frequency of the ultrasonic generator specifically includes the following steps S131-S132:

S131, according to the current working frequency of the ultrasonic generator, determining the upper limit value of the current frequency searching range of the ultrasonic generator by the following formula:

$$f_{upper}=f+f_2 \tag{1}$$

Wherein $f_{upper}$ is the upper limit value of the current frequency searching range of the ultrasonic generator; f is the current working frequency of the ultrasonic generator; $f_2$ is a preset second frequency threshold value;

S132, according to the current working frequency of the ultrasonic generator, determining the lower limit value of the current frequency searching range of the ultrasonic generator by the following formula:

$$f_{lower}=f-f_3 \tag{2}$$

Wherein $f_{lower}$ is the lower limit value of the current frequency searching range of the ultrasonic generator; f is the current working frequency of the ultrasonic generator; $f_3$ is a preset third frequency threshold value.

Specifically, based on the current operating frequency of the ultrasonic generator, the upper limit value and the lower limit value of the current frequency searching range of the ultrasonic generator are respectively calculated and obtained through the above formulas (1) and (2), so that the current frequency searching range of the ultrasonic generator is determined.

It should be noted that, both the second frequency threshold value and the third frequency threshold value of this embodiment may be set according to an actual use situation, and the present invention is not limited to this. Preferably, the second frequency threshold value of the present embodiment is 50 Hz-100 Hz; the third frequency threshold value is 50 Hz-100 Hz. In addition, the execution sequence of steps S131-S132 is not limited in the embodiment of the present invention, for example, step S132 may be executed first, and then step S131 is executed, and of course, steps S131 and S132 may also be executed at the same time, which is not described herein again.

In a preferred embodiment, in step S14 of this embodiment, the controlling the ultrasonic generator to search for an anti-resonance point in the current frequency searching range specifically includes the following steps S141-S144:

S141, controlling the ultrasonic generator to search the frequency in the current frequency searching range, and acquiring a working current corresponding to each frequency point in the current frequency searching range;

S142, judging whether a value of the working current corresponding to each frequency point is equal to a preset minimum value or not;

S143, while the value of the working current corresponding to any frequency point is equal to the preset minimum value, determining the frequency point to be the anti-resonance point;

S144, while the value of the working current corresponding to each frequency point is not equal to the preset minimum value, determining that the anti-resonance point is not searched in the current frequency searching range.

Specifically, judging sequentially whether the value of the working current corresponding to each frequency point is equal to the preset minimum value or not; while the value of the working current corresponding to any frequency point is judged to be equal to the preset minimum value, it indicates that the anti-resonance point is found in the current frequency searching range, and the anti-resonance point is the frequency point corresponding to the preset minimum value of the working current; and while the value of the working current corresponding to each frequency point in the current frequency searching range is judged not to be equal to the preset minimum value, determining that the anti-resonance point is not searched in the current frequency searching range.

In addition, it should be noted that, it is only one specific implementation manner of controlling the ultrasonic generator to search for an anti-resonance point in the current frequency searching range, and the embodiment of the present invention does not limit the specific manner of controlling the ultrasonic generator to search for an anti-resonance point in the current frequency searching range, and a person skilled in the art may also use other manners to control the ultrasonic generator to search for an anti-resonance point in the current frequency searching range according to specific situations in practical applications.

In the embodiment of the present invention, in order to ensure accuracy and efficiency of searching for an anti-resonance point in the current frequency searching range, it is preferable that the embodiment controls the ultrasonic generator to search for an anti-resonance point in the current frequency searching range for a frequency searching time of about 200 ms-400 ms.

Figure 2:
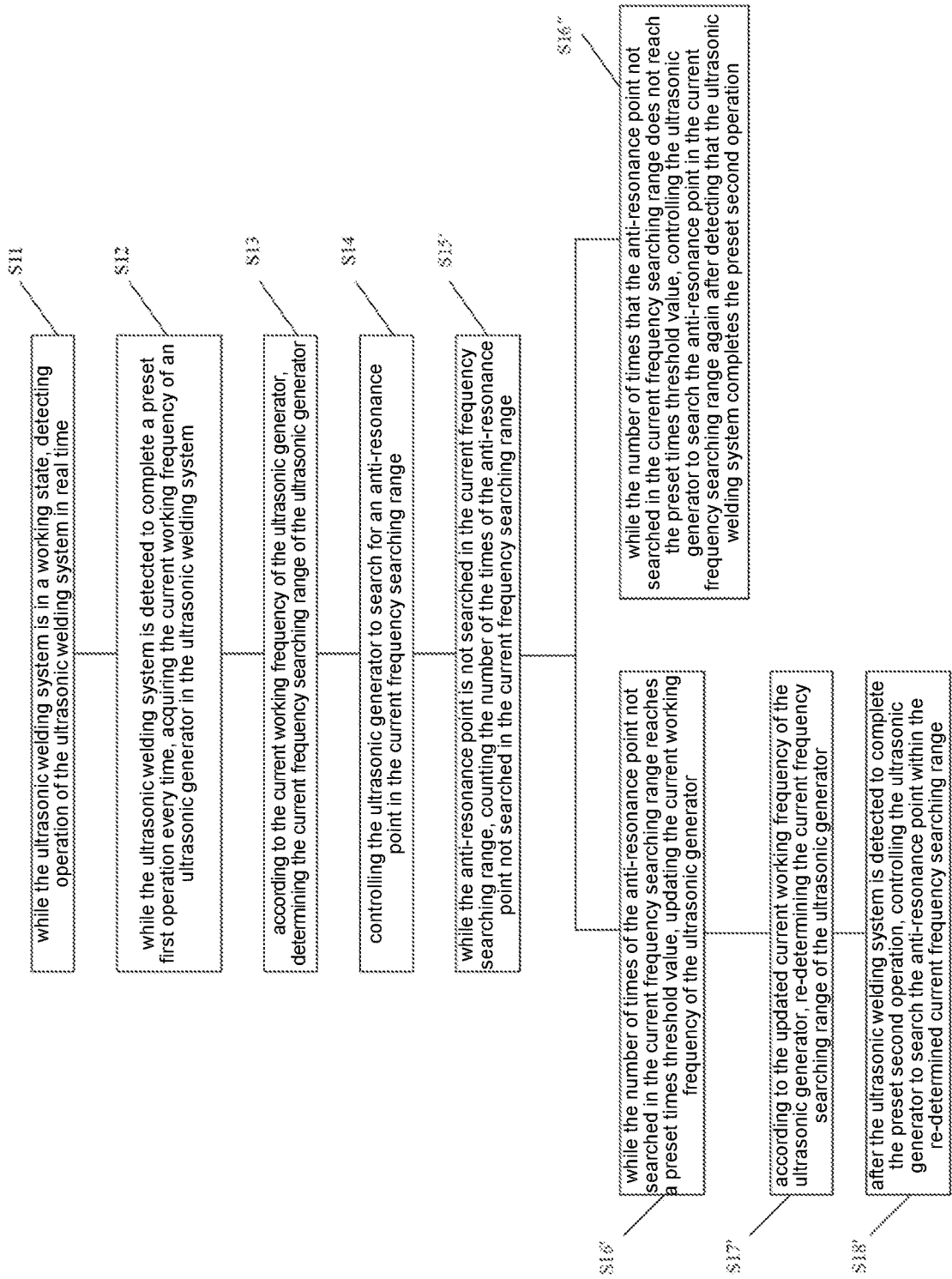
FIG. 2 is a schematic flow chart diagram of another control method of an ultrasonic welding system in accordance with an embodiment of the present invention.

In a preferred embodiment, as shown in FIG. 1 and FIG. 2, the control method of the ultrasonic welding system of the present embodiment further includes the following steps S15'-S18':

S15', while the anti-resonance point is not searched in the current frequency searching range, counting the number of the times of the anti-resonance point not searched in the current frequency searching range;

S16', while the number of times of the anti-resonance point not searched in the current frequency searching range reaches a preset times threshold value, updating the current working frequency of the ultrasonic generator;

S17', according to the updated current working frequency of the ultrasonic generator, re-determining the current frequency searching range of the ultrasonic generator; and S18', after the ultrasonic welding system is detected to complete the preset second operation, controlling the ultrasonic generator to search the anti-resonance point within the re-determined current frequency searching range.

Specifically, while the anti-resonance point is not searched in the current frequency searching range, counting the number of the times of the anti-resonance point not searched in the current frequency searching range once; then, judging whether the number of the times of the anti-resonance point is not searched in the current frequency searching range reaches the preset times threshold value or not; while the number of times of the anti-resonance point not searched in the current frequency searching range reaches the preset times threshold value, indicating that the anti-resonance point does not exist in the current frequency searching range, and updating the current working frequency of the ultrasonic generator so as to re-determine the current frequency searching range of the ultrasonic generator; then, after the ultrasonic welding system is detected to complete the preset second operation, controlling the ultrasonic generator to search the anti-resonance point within the re-determined current frequency searching range; then, the step S15 or S15' is executed in return according to the actual result of the search. It should be noted that the preset times threshold value may be set according to an actual use situation, and the present invention is not limited to this.

Further, as shown in FIG. 2, the control method of an ultrasonic welding system of the present embodiment further includes the following step S16":

S16", while the number of the times that the anti-resonance point not searched in the current frequency searching range does not reach the preset times threshold value, controlling the ultrasonic generator to search the anti-resonance point in the current frequency searching range again after detecting that the ultrasonic welding system completes the preset second operation.

Specifically, counting the number of the times of the anti-resonance point not searched in the current frequency searching range, while it is determined that the times that the anti-resonance point is not searched in the current frequency searching range does not reach the preset times threshold value, it indicates that the anti-resonance point may not be searched in the current frequency searching range due to some factors; in order to ensure the accuracy of frequency searching, controlling the ultrasonic generator to search the anti-resonance point in the current frequency searching range again after detecting that the ultrasonic welding system completes the preset second operation, so as to search the anti-resonance point for the Nth time in the current frequency searching range; wherein N is less than or equal to the preset time threshold value; then, the step S15 or S15' is performed in return according to the actual result of the search.

In a preferred embodiment, in step S16' of this embodiment, while the number of the times of the anti-resonance point which is not searched in the current frequency searching range reaches the preset times threshold value, updating the current working frequency of the ultrasonic generator specifically includes the following steps:

while the number of the times of an anti-resonance point which is not searched in the current frequency searching range reaches the preset times threshold value, updating the current working frequency of the ultrasonic generator by the following formula:

$$f_{new}=f_{old}+f_1 \qquad (3)$$

Wherein $f_{new}$ is the current working frequency of the ultrasonic generator after updating; $f_{old}$ is the current working frequency of the ultrasonic generator before updating; $f_1$ is a preset first frequency threshold value.

It should be noted that the first frequency threshold value may be set according to an actual use situation, and the present invention is not limited to this. Preferably, the first frequency threshold value of the present embodiment is 50 Hz to 100 Hz.

In addition, here, only one specific implementation manner of updating the current operating frequency of the ultrasonic generator is used, the specific manner of updating the current operating frequency of the ultrasonic generator is not limited in the embodiment of the present invention, and a person skilled in the art may also adopt other manners to update the current operating frequency of the ultrasonic generator according to specific situations in practical applications.

Further, while step S17' is implemented, based on the updated current operating frequency of the ultrasonic generator, the upper limit value and the lower limit value of the current frequency searching range of the ultrasonic generator are obtained through calculation by the above equations (1) and (2), respectively, so as to re-determine the current frequency searching range of the ultrasonic generator.

Further, while step S18' is implemented, after detecting that the ultrasonic welding system completes the preset second operation, the ultrasonic generator may be controlled to search for the anti-resonance point within the re-determined current frequency searching range based on the specific implementation manner of the present embodiment of steps S141-S144. Specifically, after the ultrasonic welding system is detected to complete the preset second operation, whether the value of the working current corresponding to each frequency point in the re-determined current frequency searching range is equal to the preset minimum value is sequentially judged; while the value of the working current corresponding to any frequency point is judged to be equal to the preset minimum value, the anti-resonance point is searched in the re-determined current frequency searching range and is a frequency point corresponding to the preset minimum value of the working current; and while the value of the working current corresponding to each frequency point in the re-determined current frequency searching range is not equal to the preset minimum value, determining that the anti-resonance point is not searched in the re-determined current frequency searching range.

In the embodiment of the present invention, preferably, the second operation in the embodiment specifically is:

completing the welding operation of the current workpiece.

Specifically, in the implementation of step S18', after detecting that the ultrasonic welding system has completed the welding operation of the current workpiece, the ultrasonic generator is controlled to search for an anti-resonance point within the re-determined current frequency search range. While step S16" is implemented, while the number of the times that the anti-resonance point is not searched for in the current frequency searching range does not reach the preset times threshold value, after detecting that the ultrasonic welding system has completed the welding operation of the current workpiece, the ultrasonic generator is controlled to search for the anti-resonance point again in the current frequency search range.

It can be understood that the impedance of the oscillator of the ultrasonic welding system can be changed drastically during the welding process of the workpieces, so that the frequency cannot be searched correctly. The present embodiment effectively avoids the operation of the ultrasonic welding system to weld the workpiece affecting the search frequency by controlling the ultrasonic generator to search for the anti-resonance point in the current search frequency range only after detecting that the ultrasonic welding system has completed the welding operation of the current workpiece while step S18' or step S16" is carried out, thereby further ensuring the accuracy of searching for the anti-resonance point in the current search frequency range.

In a preferred embodiment, before implementing step S11, the control method of the ultrasonic welding system of the present embodiment further includes the following steps S01-S02:

S01, controlling the ultrasonic generator to search for the anti-resonance point in the preset frequency searching range after the ultrasonic welding system is powered on;

S02, taking the searched anti-resonance point as the working frequency of the ultrasonic welding system, and controlling the ultrasonic welding system to start working.

Specifically, after the ultrasonic welding system is powered on, in order to ensure that the ultrasonic welding system works in a resonance state, controlling the ultrasonic generator to search for the anti-resonance point in the preset frequency searching range, taking the searched anti-resonance point as the working frequency of the ultrasonic welding system, and controlling the ultrasonic welding system to start working; at this point, the ultrasonic welding system enters the working state.

Figure 3:
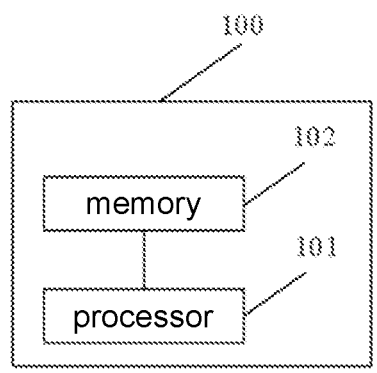
FIG. 3 is a schematic structural diagram of an ultrasonic welding system in accordance with an embodiment of the present invention.

Referring to FIG. 3, another embodiment of the present invention correspondingly provides an ultrasonic welding system.

The ultrasonic welding system 100 provided by the embodiment of the present invention comprises a processor 101, a memory 102, and a computer program stored in the memory 102 and configured to be executed by the processor 101, and while the processor executes the computer program, the processor implements the control method of an ultrasonic welding system described above.

In the embodiment of the present invention, by the ultrasonic welding system 100, after the ultrasonic welding system enters a working state, while the ultrasonic welding system is detected to complete each preset first operation, controlling the ultrasonic generator to search for an anti-resonance point in the current frequency searching range, and while the anti-resonance point is searched in the current frequency searching range, adjusting the working frequency of the ultrasonic generator to be the anti-resonance point, so that the output frequency of the ultrasonic generator is kept consistent with the resonance frequency of the ultrasonic welding system, namely the ultrasonic welding system is ensured to work in a resonance state, the welding stability of the ultrasonic welding system is improved, and the phenomenon of false welding or desoldering in the welding process of the ultrasonic welding system is effectively prevented, thus ensuring the quality of the welded workpiece (such as a mask, medical protective clothing and the like).

Illustratively, the computer program may be partitioned into one or more modules/units that are stored in the memory 102 and executed by the processor 101 to implement the present invention. The one or more modules/units may be a series of computer program instruction segments capable of performing specific functions that describe the execution of the computer program in the ultrasonic welding system 100.

The processor 101 may be a central processing unit (CPU), other general processor, a digital signal processor (DSP), an application specific integrated circuit (ASIC), an off-the-shelf programmable gate array (FPGA) or other programmable logic device, discrete gate or transistor logic, discrete hardware components, etc. A general processor may be a microprocessor or the processor may be any conventional processor or the like.

The memory 102 may be used to store the computer programs and/or modules, and the processor 101 may implement the various functions of the ultrasonic welding system 100 by running or executing the computer programs and/or modules stored in the memory 102 and invoking data stored in the memory 102. The memory 102 may mainly include a program storage area and a data storage area, wherein the program storage area may store an operating system, an application program required by at least one function (such as a sound playing function, an image playing function, etc.), and the like; the storage data area may store data (such as audio data, a phonebook, etc.) created according to the use of the cellular phone, and the like. In addition, the memory may include high speed random access memory, and may also include non-volatile memory, such as a hard disk, a memory, a plug-in hard disk, a smart media card (SMC), a secure digital (SD) card, a flash memory card (Flash Card), at least one magnetic disk storage device, a Flash memory device, or other volatile solid state storage device.

Wherein the integrated modules/units of the ultrasonic welding system 100, if implemented as software functional units and sold or used as stand-alone products, may be stored in a computer readable storage medium. Based on such understanding, all or part of the flow of the method according to the embodiments of the present invention may also be implemented by a computer program, which may be stored in a computer-readable storage medium, and while the computer program is executed by a processor, the steps of the method embodiments may be implemented. Wherein the computer program comprises computer program code, which may be in the form of source code, object code, an executable file or some intermediate form, etc. The computer-readable medium may include: any entity or device capable of carrying the computer program code, recording medium, usb disk, removable hard disk, magnetic disk, optical disk, computer memory, read-only memory (ROM), random access memory (RAM), electrical carrier wave signals, telecommunications signals, software distribution medium, and the like. It should be noted that the computer readable medium may contain content that is subject to appropriate increase or decrease as required by legislation and patent practice in jurisdictions, for example, in some jurisdictions, computer readable media does not include electrical carrier signals and telecommunications signals as is required by legislation and patent practice.

It should be noted that the above-described device embodiments are merely illustrative, where the units described as separate parts may or may not be physically separate, and the parts displayed as units may or may not be physical units, may be located in one place, or may be distributed on multiple network units. Some or all of the modules may be selected according to actual needs to achieve the purpose of the solution of the present embodiment. In addition, in the drawings of the embodiment of the apparatus provided by the present invention, the connection relationship between the modules indicates that there is a communication connection between them, and may be specifically implemented as one or more communication buses or signal lines. One of ordinary skill in the art can understand and implement it without inventive effort.

In summary, the present invention provides a control method of an ultrasonic welding system, an ultrasonic welding system and a storage medium, wherein after the ultrasonic welding system enters a working state, while the ultrasonic welding system is detected to complete each preset first operation, controlling the ultrasonic generator to search for an anti-resonance point in the current frequency searching range, and while the anti-resonance point is searched in the current frequency searching range, adjusting the working frequency of the ultrasonic generator to be the anti-resonance point, so that the output frequency of the ultrasonic generator is kept consistent with the resonance frequency of the ultrasonic welding system, namely the ultrasonic welding system is ensured to work in a resonance state, the welding stability of the ultrasonic welding system is improved, and the phenomenon of false welding or desoldering in the welding process of the ultrasonic welding system is effectively prevented, thus ensuring the quality of the welded workpiece.

What is claimed is:

1. A control method of an ultrasonic welding system, comprising:
   detecting operation of the ultrasonic welding system immediately while the ultrasonic welding system is in a working state;
   acquiring a current working frequency of an ultrasonic generator in the ultrasonic welding system while the ultrasonic welding system is detected to complete a preset first operation every time, wherein the first operation is completing a welding operation of a preset number threshold value of workpieces and delaying a preset time threshold value;
   determining a current frequency searching range of the ultrasonic generator according to the current working frequency of the ultrasonic generator;
   controlling the ultrasonic generator to search for an anti-resonance point in the current frequency searching range; and
   adjusting the working frequency of the ultrasonic generator to be an anti-resonance point while the anti-resonance point is searched in the current frequency searching range.

2. The control method of the ultrasonic welding system according to claim 1, further comprising:
   counting a number of the times of the anti-resonance point not searched in the current frequency searching range while the anti-resonance point is not searched in the current frequency searching range;
   updating the current working frequency of the ultrasonic generator while the number of times of the anti-resonance point not searched in the current frequency searching range reaches a preset times threshold value;
   re-determining the current frequency searching range of the ultrasonic generator according to the updated current working frequency of the ultrasonic generator; and
   controlling the ultrasonic generator to search the anti-resonance point within the re-determined current frequency searching range after the ultrasonic welding system is detected to complete a preset second operation.

3. The control method of the ultrasonic welding system according to claim 2, further comprising:
   controlling the ultrasonic generator to search the anti-resonance point in the current frequency searching range again after detecting that the ultrasonic welding system completes the preset second operation while the number of times of the anti-resonance point not searched in the current frequency searching range does not reach the preset times threshold value.

4. The control method of an ultrasonic welding system according to claim 2, updating the current working frequency of the ultrasonic generator while the number of times of the anti-resonance point not searched in the current frequency searching range reaches a preset times threshold value, specifically comprising:
   an anti-resonance updating the current working frequency of the ultrasonic generator by the following formula while the number of times of an anti-resonance point not searched in the current frequency searching range reaches the preset times threshold value:

$$f_{new} = f_{old} + f_1$$

wherein $f_{new}$ is the current working frequency of the ultrasonic generator after updating, $f_{old}$ is the current working frequency of the ultrasonic generator before updating, and $f_1$ is a preset first frequency threshold value.

5. The control method of the ultrasonic welding system according to claim 1, wherein said determining the current frequency searching range of the ultrasonic generator according to the current working frequency of the ultrasonic generator, specifically comprising:
   determining the upper limit value of the current frequency searching range of the ultrasonic generator by the following formula according to the current working frequency of the ultrasonic generator:

$$f_{upper} = f + f_2$$

wherein $f_{upper}$ is the upper limit value of the current frequency searching range of the ultrasonic generator, f is the current working frequency of the ultrasonic generator, and $f_2$ is a preset second frequency threshold value;

determining the lower limit value of the current frequency searching range of the ultrasonic generator by the following formula according to the current working frequency of the ultrasonic generator:

$$f_{lower} = f - f_3$$

wherein $f_{lower}$ is the lower limit value of the current frequency searching range of the ultrasonic generator, f is the current working frequency of the ultrasonic generator, and $f_3$ is a preset third frequency threshold value.

6. The control method of the ultrasonic welding system according to claim 1, wherein said controlling the ultrasonic generator to search for the anti-resonance point in the current frequency searching range, specifically comprising:

controlling the ultrasonic generator to search the frequency in the current frequency searching range, and acquiring a working current corresponding to each frequency point in the current frequency searching range;

judging whether a value of the working current corresponding to each frequency point is equal to a preset minimum value or not;

determining the frequency point to be the anti-resonance point while the value of the working current corresponding to each frequency point is equal to the preset minimum value; and determining that the anti-resonance point is not searched in the current frequency searching range while the value of the working current corresponding to each frequency point is not equal to the preset minimum value.

7. The control method of the ultrasonic welding system according to claim 2, wherein the second operation specifically comprising:

completing the welding operation of the current workpiece.

8. The control method of the ultrasonic welding system according to claim 1, further comprising:

controlling the ultrasonic generator to search for the anti-resonance point in a preset frequency searching range after the ultrasonic welding system is powered on; and taking the searched anti-resonance point as the working frequency of the ultrasonic welding system, and controlling the ultrasonic welding system to start working.

9. An ultrasonic welding system, comprising a processor, a memory, and a computer program stored in the memory and configured to be executed by the processor, wherein the control method of the ultrasonic welding system realized according to claim 1 while the processor executes the computer program.

10. A computer-readable storage medium, wherein a program is stored on the computer-readable storage medium, the control method of the ultrasonic welding system realized according to claim 1 while the program executed.

* * * * *